(No Model.)

F. F. LANDIS.
CRANK PIN.

No. 512,552.  Patented Jan. 9, 1894.

WITNESSES:
Walter Allen
Thos. E. Robertson

INVENTOR
Frank F. Landis
BY
Herbert W. Jenner.
ATTORNEY.

THE NATIONAL LITHOGRAPHING COMPANY,
WASHINGTON, D. C.

UNITED STATES PATENT OFFICE.

FRANK F. LANDIS, OF WAYNESBOROUGH, PENNSYLVANIA.

CRANK-PIN.

SPECIFICATION forming part of Letters Patent No. 512,552, dated January 9, 1894.

Application filed May 25, 1893. Serial No. 475,442. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Crank-Pins; and I do hereby declare the following to be a full, clear, and exact description of the invention, such as will enable others skilled in the art to which it appertains to make and use the same.

This invention relates to crank pins and particularly to those used on the main driving shafts of high pressure steam engines.

This invention consists in the novel construction and combination of the parts hereinafter fully described and claimed.

Figure 1:
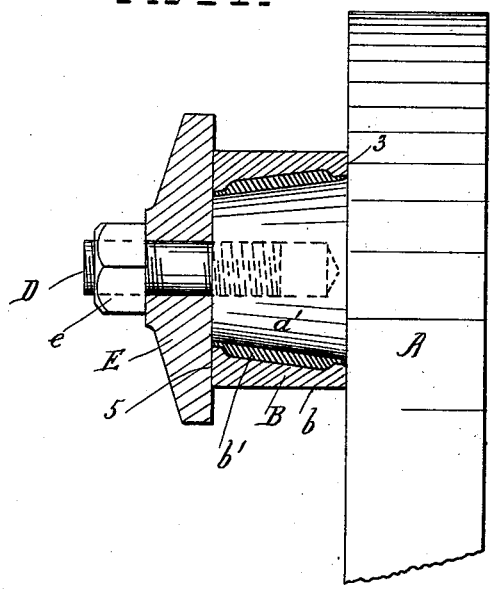
Figure 2:
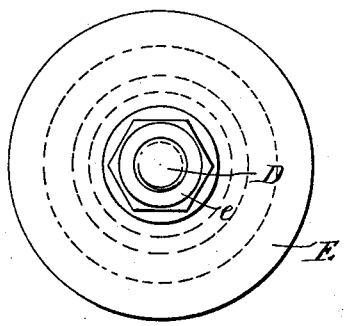
Figure 3:
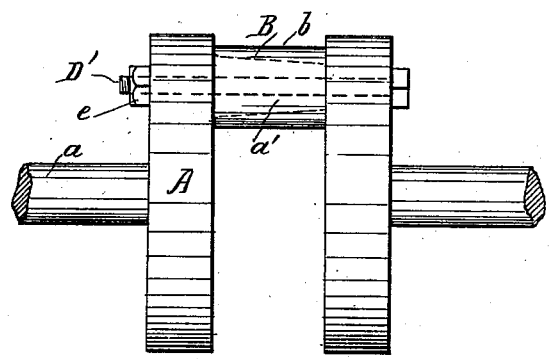

In the drawings: Figure 1 is a side view of a portion of a crank plate provided with a crank pin according to this invention and shown partly in section. Fig. 2 is an end view of the crank pin. Fig. 3 is a side view showing a modification of the device shown in Fig. 1.

A is the crank plate which is secured upon the crank shaft $a$ in any approved manner.

Prior to this invention crank pins have been forced into holes in the crank plate by hydraulic pressure which rendered it very expensive to renew them when they become worn, and those crank pins which were merely driven into holes in the plates frequently became loose.

According to the present invention a conical boss $a'$ is cast integral with, or otherwise firmly secured to, the crank plate and its outer conical surface is accurately turned.

B is a metallic sleeve which is preferably made of cast iron and has its outer surface $b$ cast in a chill. The inner part of the sleeve is cast of the same taper as the boss $a'$ and is provided with an annular chamber $b'$. The end 3 of the sleeve is first turned off true and the sleeve is then stood upon a flat plate provided with a projecting boss of the same taper as the boss $a'$. The space around the boss in the chamber $b'$ is then filled with Babbitt metal or other equivalent alloy used for bearings. The sleeve is then put upon a mandrel and its circumference $b$ is accurately ground, and its end surface 5 is also faced off so that the sleeve may be of the exact length required. The sleeve is then slipped over the boss $a'$ on the crank plate.

D is a pin which is screwed into, or otherwise firmly secured into the boss $a'$.

E is a plate which is slipped over the end of the pin D, and is pressed against the end of the sleeve by the nut $e$ which is screwed upon its projecting end.

The end of the connecting rod bears on the outer circumference of the sleeve B. When the sleeve B becomes worn it is taken off by removing the nut $e$ and plate E, and another similar sleeve is substituted for it.

The device shown in Fig. 3 shows the crank pin formed between two crank plates, which are secured together by the bolt $D'$.

What I claim is—

A crank-pin, consisting of a conical boss projecting from a crank plate, a removable sleeve provided with a hardened external bearing surface and a liner permanently secured in the said sleeve and having its internal surface conical and concentric with the said hardened bearing surface, and means for securing the said sleeve upon the said boss and permitting it to be replaced when its bearing surface becomes worn, substantially as set forth.

In testimony whereof I affix my signature in presence of two witnesses.

FRANK F. LANDIS.

Witnesses:
HERBERT W. T. JENNER,
A. D. MORGANTHALL.